Aug. 6, 1968    S. H. AULD    3,396,323
DIRECT CURRENT MOTOR SPEED CONTROL
Filed Sept. 27, 1965    2 Sheets-Sheet 1
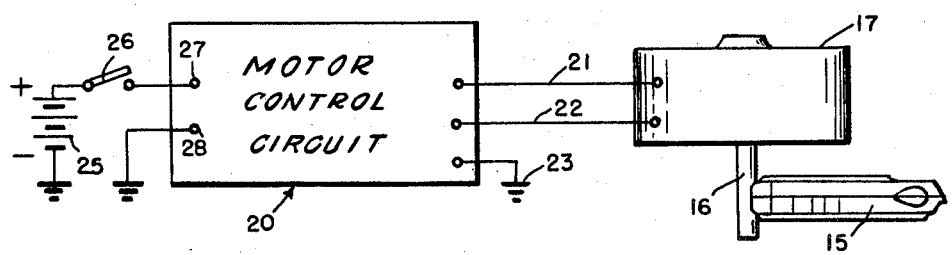
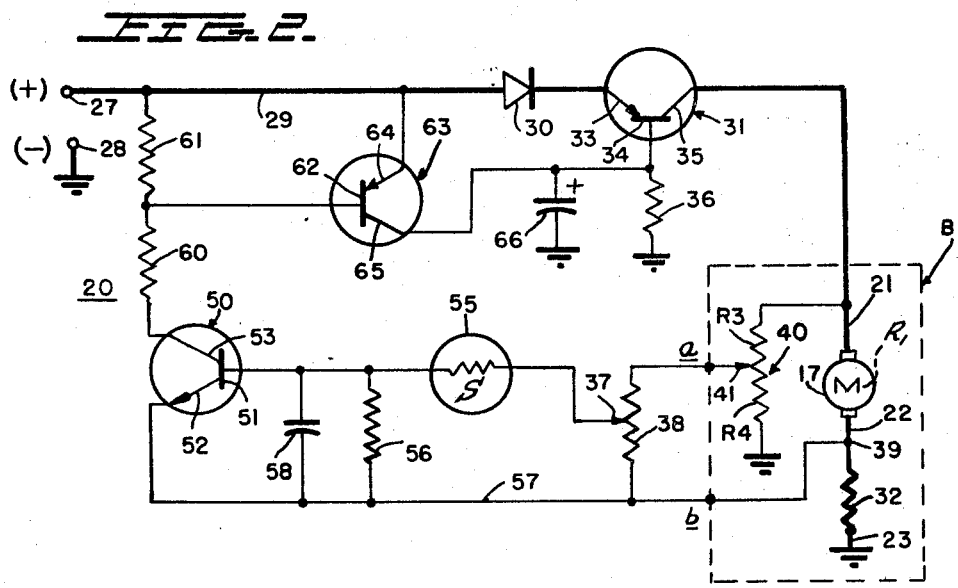
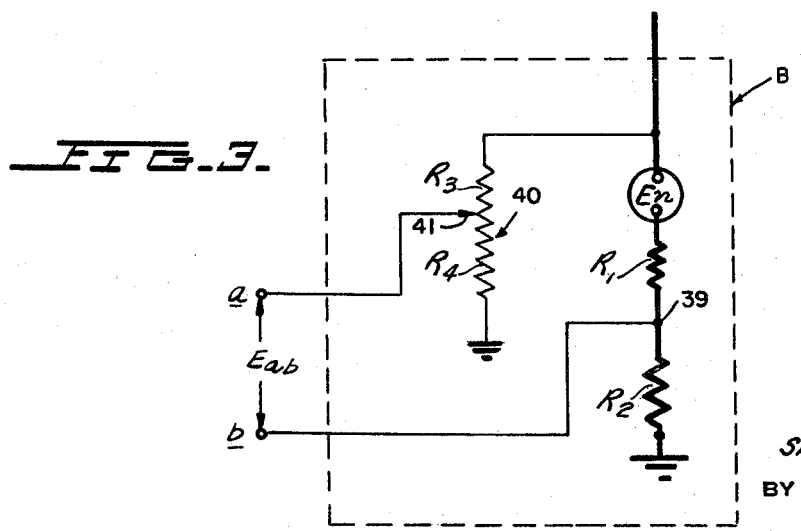
INVENTOR
SAMUEL H. AULD
BY
R. A. Marsan
his attorney Aug. 6, 1968
S. H. AULD
3,396,323
DIRECT CURRENT MOTOR SPEED CONTROL
Filed Sept. 27, 1965
2 Sheets-Sheet 2
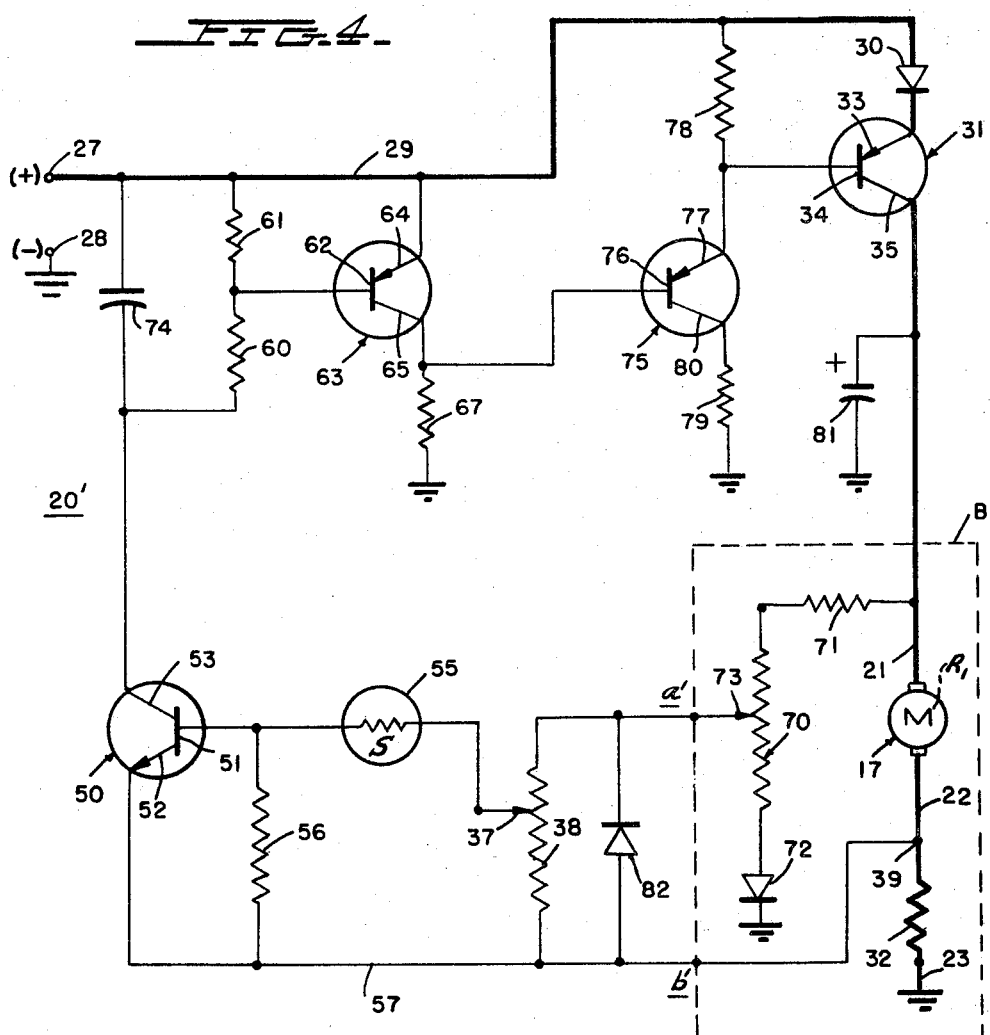
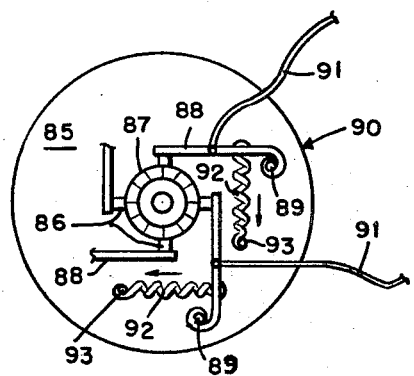
INVENTOR
SAMUEL H. AULD
BY
R.A. Mansen
his attorney

United States Patent Office 3,396,323
Patented Aug. 6, 1968

3,396,323
DIRECT CURRENT MOTOR SPEED CONTROL
Samuel H. Auld, Bloomfield Hills, Mich., assignor to Lear Jet Corporation, Wichita, Kans., a corporation of Delaware
Filed Sept. 27, 1965, Ser. No. 490,551
8 Claims. (Cl. 318—331)

ABSTRACT OF THE DISCLOSURE

A magnetic tape transport is driven by a low voltage D.C. motor. A transistor in the armature circuit of the motor is regulated by proper bias to provide a precise control of speed by sensing the motor counter E.M.F. Rapid acceleration to the desired speed is provided by biasing the transistor into fully conductive state at startup.

---

This invention relates to motor speed control circuits, and more particularly relates to novel circuits for the operation of a direct current motor uniformly at a predetermined speed.

A motor used for driving the magetic tape of a player is desirably controlled to operate at an exact and constant speed to reproduce quality music. An important basis of faithful sound playback is to maintain a constant speed for the tape past the magnetic head. Variations in tape speed cause the aberrations known as flutter and wow that reduce the quality of the reproduced sound. Reducing the number of elements in the tape drive and handing mechanism permits improvement of acoustic clarity. Elimination of the commonly used belt and pulley, and their bearings, contributes materially to this objective. Direct motor drive of the tape through its shaft as capstan is the simplest approach, is more reliable having the least mechanism than other drive systems.

The operation of magnetic tape players in automobiles and other vehicles is generally powered by storage batteries. The invention motor control circuit is operable from such low voltage direct current sources, and closely controls the motor speed despite wide variation in applied voltage encountered in use. The control circuit hereof is relatively simple yet very effective for smooth quality sound reproduction from the magnetic tape. The circuit hereof basically employs control transistors in conjunction with a novel and very advantageous back-electromotive force motor bridge circuit arrangement, as will be described in detail hereinafter. A minimum of electronic components is used in the circuits hereof, with no voltage reference Zener diode nor silicon controlled rectifier. The speed sensing is direct, with very sensitive response to motor back-E.M.F. change in the bridge circuit referred to. Further, no light source or photo-responsive means is employed, nor any tachometer means.

The invention control circuit arrangement senses motor speed change through the bridge control signal due to motor current and back-E.M.F. change, and very rapidly controls the motor so as to maintain a preset constant back-E.M.F. and thus constant motor speed. The motor control circuit hereof provides optimum control of a direct current motor even when it has a sizeable amount of rotational inertia. Such large inertia is used in the directly driven magnetic tape system referred to, combining the flywheel action that was heretofore provided separately. The electronic speed control functions uniformly and responds rapidly to even tiny speed changes. Motors with large rotational mass and relatively slow speed for direct tape drive, as well as other D.C. motor types and applications are smoothly controlled herewith, as the invention control system senses change in motor current as well as motor speed. A further important advantage is that the motor control circuit hereof provides a large starting voltage to promply accelerate even a heavy inertia motor to its operating speed, e.g. in about one second.

The uniform rotational speed at the shaft of the direct current motor afforded by the present invention results despite voltage changes over a wide range, wide ambient temperature changes, mechanical eccentricity in the tape cartridge, mechanical impacts, or road bumps when the player is in an automobile. The acoustic performance of a magnetic tape player with the motor control system hereof is crisp, clear, clean and authentic even in mobile use or adverse environment. It is very practicable for stereophonic dual-track music reproduction. The motor control system hereof is of course applicable in other fields. The invention electronic control system is relatively inexpensive, and simple to construct and adjust in service.

The above and further features, advantages and objects of the present invention will become more apparent from the following description of an exemplary embodiment thereof, illustrated in the accompanying drawings, in which:

FIG. 1 is a diagrammatic showing of the motor control system of the present invention.

FIG. 2 is a circuit diagram of an exemplary embodiment of the invention control system.

FIG. 3 is a schematic representation of the bridge section of the FIG. 2 circuit.

FIG. 4 is a circuit diagram of another form of the invention control system.

FIG. 5 illustrates the motor brush arrangement used with the constant speed control circuits hereof.

The magnetic tape player of FIG. 1 contains a cartridge 15 within which is a reel of magnetic tape in endless configuration. The shaft 16 of the motor 17 serves as a capstan to directly drive the tape within cartridge 15. Such direct tape drive and cartridge arrangement is shown in the copending patent application for "Combination Radio and Magnetic Cartridge Player," Ser. No. 392,212, filed on Aug. 26, 1964, and assigned the same assignee. The contained magnetic tape passes across the face of a magnetic head as shown and described in said copending patent application. The shaft 16 is pressed against the tape and a pinch roller contained within the cartridge (not shown) to drive the tape past the head at the constant speed, e.g. 3.75 inches per second.

The motor control circuit 20, indicated in block form in FIG. 1, operates motor 17 at a preset constant speed or r.p.m. Its output terminals 21, 22 connect directly to the direct current motor (17). For the exemplary control the motor is preferably of the permanent magnet field type; the shunt-wound field type also being suitable. A third control output lead 23 connects to ground or negative return. The control circuit hereof (20) is energized by a direct current source 25, such as the vehicle storage battery at say 12.0 volts nominal potential. Other D.C. voltage sources and magnitudes are also contemplated therewith. The positive terminal of battery 25 energizes control 20, and the motor 17 thereby, through on-off switch 26 at input terminal 27. The negative terminal of the battery and input terminal 28 both connect to signal ground. It is to be understood that in some applications of the invention circuital arrangements may be incorporated that use the reverse battery polarity at control input (27, 28).

FIG. 2 schematically denotes an exemplary embodiment of the invention motor control circuit 20. FIG. 4 diagrams the same basic control circuit as FIG. 2, with added circuital refinements for optimum overall results, as will be set forth hereinafter. The positive voltage input

(27) is conducted to the commutator and armature of motor 17 by lead 29, diode 30 and power transistor 31 in series array; the D.C. circuit being completed to signal ground through the motor via series resistor 32.

In the exemplary circuit configuration transistor 31 is of the PNP type with its emitter 33 at a more positive potential than its base 34 and collector 35. The power and current rating of transistor 31 is made ample to effect the speed control and operation of the motor 17, as will be understood by those skilled in the art. The operating current of the exemplary motor 17 under normal conditions is of the order of 400 milliamperes. Its starting up current may reach three amperes for a short duration. A suitable biasing resistor 36 is connected between transistor base 34 and signal ground. In normal operation at the preset motor speed, the bias and signal configuration of transistor 31 results in a continuous direct current flow through it of the magnitude to maintain the motor 17, in series circuit therewith, uniformly at its speed. The motor speed presetting is readily accomplished by adjustment of the position of wiper 37 on potentiometer 38.

Stable speed operation results with the invention control hereof, with sensitive instantaneous response to any tendency of the motor to change its rate of revolving, within even a small fraction of a turn. The relatively high inertia motor drive (17) at the slow speed for direct tape transport in cartridge 15, coupled with the direct current speed control 20 has been found to provide practically flawless acoustic performance. Listening to a magnetic tape player with the control-motor drive of this invention in play operation in a moving vehicle, the average person cannot discern reproduction vagaries even when riding over rough or bumpy roads. Further, the electronic speed control circuit (2) remains practical and effective over a wide ambient range of humidity and of temperature.

Basically, the invention control system comprises a novel bridge circuit arrangement B which derives a control signal $E_{ab}$ that is directly proportional to the motor speed in combination with a control circuit configuration that is directly and sensitively responsive to bridge signal $E_{ab}$ to in turn control motor transistor 31 in the manner to be described, and thereby continuously and uniformly maintain the motor at its speed or r.p.m. as preset by the proportional tap 37 on potentiometer 38. Towards this end, the armature and the commutator brushes of the motor 17 together form one arm of the bridge, represented as resistance arm $R_1$. The adjacent resistor 32 is arm $R_2$ of bridge B. Potentiometer 40 is in parallel across $R_1$, $R_2$ between lead 21 and signal ground.

Potentiometer 40 forms the other two resistance arms of bridge B, namely $R_3$ and $R_4$. The ratio of $R_3$ to $R_4$ is adjustable through the position of wiper or tap 41 to which control signal terminal $a$ connects. The signal terminal $b$ connects to the juncture 39 of motor lead 22 and resistor 32. Terminals $a$, $b$ are the output of control bridge B, with control signal $E_{ab}$ appearing thereacross, as indicated in FIGS. 2 and 3. The rotation of motor 17 results in a generated back-E.M.F. that is directly proportional to the motor speed or r.p.m. This back-E.M.F., noted as $E_n$ in FIG. 3 is in series with arm $R_1$. $E_n$ is a direct current potential, being commutated by the motor commutator. The positive or higher potential side of $E_{ab}$ is at bridge terminal $a$. The bridge output control signal $E_{ab}$ is applied to the electronic transistor control circuit, that in turn controls the operation of motor transistor 31, and forms a closed control loop with the operating motor (17).

An important further feature of the invention control system is to provide a significantly low voltage drop across the commutator-brush section of the D.C. motor (17) being controlled. This is to minimize the effect of variations in resistance of the brush operation upon the magnitude of control signal $E_{ab}$ in relation to the generated $E_n$. In this manner, the back-E.M.F. $E_n$ remains fully meaningful in the circuit control action, and the resultant speed of the motor truly remains constant. The back-E.M.F. voltage $E_n$ passes through the commutator and brushes before emerging as control signal $E_{ab}$ at bridge B, and suffers a small voltage loss thereat. Towards this end the brushes are made of very low resistance material consistant with satisfactory wear resistance, and are constructed to be mechanically stable in position, as described in more detail hereinafter in connection with FIG. 5.

The output control signal $E_{ab}$ of the control bridge is thus a substantially direct measure or analog of the motor (17) speed in D.C. potential form. Bridge B may be balanced or set to null or zero signal at its terminals $a$, $b$ when the motor (17) is held stalled at zero speed with the power source "on," i.e. with switch 26 closed. When the motor is in operation, the resultant bridge signal $E_{ab}$ would be proportional to the motor r.p.m. due to its back-E.M.F. $E_n$, as aforesaid. Voltage signal $E_{ab}$ is applied across speed-adjust potentiometer 38, whereby the position of tap 37 thereon presents a desired portion or percentage of $E_{ab}$ to the control circuit, including reference control transistor 50.

In practical operation however, it is advantageous to set wiper 41 slightly higher on potentiometer 40, in the direction that reduces the ratio $R_3/R_4$. This results in terminal $a$ being positive with respect to terminal $b$ by a small amount, yielding a small magnitude output voltage when motor 17 is held in stall condition. The overall stability of the control circuit hereof is improved significantly thereby. Such stall signal, generally only a small fraction of a volt in magnitude at terminals $a$, $b$, correspondingly raises the magnitude of control signal $E_{ab}$ in normal operation, and results in the enhanced stability. The resultant analog voltage $E_{ab}$ has been found to inhibit hunting or oscillation of the motor in the closed control loop hereof. It is effectively damped, and even from a stall-start and rapid acceleration, the preset motor speed $N_0$ is reached smoothly and without overshooting within a second or two.

The use of resistor 32 arm is important in that it creates the bridge B configuration that results in the motor speed analog voltage $E_{ab}$. The resistor 32 is made non-inductive, as of carbon type. Similarly, potentiometers 38 and 40 are non-inductive, preferably carbon types. In this way, voltage spikes in the control action are avoided, that may be caused by inductive surges or sparking in the operation of the motor. Such spikes could disrupt or disturb the control signal function.

The bridge B configuration results in its output terminals $a$, $b$ being off signal ground; at above ground potential in the exemplary circuit. Series resistor $R_2$ is of the order of one to two ohms to minimize its series voltage drop in the motor line. An exemplary 1.5 ohm value for this resistor (32) provides a positive potential above signal ground of 0.65 volt at juncture 39 (and $b$) at the nominal running current of 400 milliamperes for the motor. The corresponding running voltage across the exemplary motor (17), at the normal speed $N_0$ of 286 r.p.m., is 4.5 volts D.C. The above-ground potential of terminal $b$ varies with the amount of current that flows through the armature of motor 17, and the resistor 32. However the control signal $E_{ab}$ is a true practical analog of the motor speed (N). The electronic control circuit hereof is made responsive to $E_{ab}$ without reference to the base potential of terminal $b$.

The base reference for the speed control by the signal is the input threshold level of the junction transistor 50 upon which control signal $E_{ab}$ is impressed. This transistor threshold reference is the forward break-over voltage of the base 51-emitter 52 junctions of the control transistor 50. Thus the absolute value of the D.C. analog signal $E_{ab}$ from the motor bridge B is directly related to the input signal threshold level of the initial control transistor (50). This threshold voltage value for a given transistor changes as a function of temperature. Circuit means are provided to automatically compensate for such changing by the use of temperature sensitive elements. For this purpose a silicon "Sensistor" 55 is connected in series between tap 37 and base 51, with resistor 56 in shunt across the base-emitter 51, 52. The emitter 52 connects to the terminal $b$ by return lead 57.

The "Sensistor" manufactured by Texsas Instruments, is a doped silicon resistor with an emphasized positive linear temperature coefficient. Shunt resistor 56 may be made equal to the normal resistance of "Sensistor" 55 at room temperature, say 10,000 ohms at 70° F. At a rise in ambient temperature, the increase in the resistance of the temperature-sensitive element 55 results in a corresponding lowered ratio of signal from tap 37 being applied to base 51, as resistor 56 remains substantially unchanged. As the threshold voltage value decreases with temperature rise, the net effect of the response by transistor 50, despite its threshold voltage shift, is unchanged. Conversely, upon temperature decrease with respect to the present reference, the drop in resistance value of "Sensistor" 55 results in a corresponding increase in applied signal to base 51, to overcome the reduced response of transistor 50. Excellent speed regulation results therefrom from below −25° F. to above +160° F., with the speed remaining constant and acoustic reproduction smooth. As a practical matter, should the speed at either extreme of the temperature range be off even about 2% from $N_0$ at 70° F., excellent performance is accomplished as the motor speed remains steady at any temperature of its surroundings. Further refinement in temperature stabilization of the circuit, overall, would reduce the small speed drift (vs. $N_0$) referred to.

An alternate manner of temperature compensation is to replace the "Sensistor" 55 with an ordinary resistance, and to use a thermistor for the shunt resistor 56. The reference input signal threshold level of the transistor 50, referred to hereinabove, may be viewed as being changed due to the variation of the emitter-base junction resistance with temperature. The emitter-base junction resistance has a negative temperature coefficient of resistance: decreasing with temperature rise, and vice versa. The thermistor also has a negative temperature coefficient of resistance. In position at resistance 56, it would fall in value with temperature rise, and thus correspondingly decrease the speed analog signal value applied to base 51. The net result is to compensate for the rise in response of transistor 50 with temperature rise; and vice versa. Transistor 50 is further stabilized with a small capacitor 58 in shunt across its input 51, 52. Capacitor 58 low passes response of the control loop so that it does not respond to inductive transients, such as may be caused by momentary changes in brush contact resistance of the motor.

The collecter 53 of transistor 50 connects to the positive line 29 through resistors 60, 61 in series. These resistors are proportioned to provide suitable operating potential to collector 53 as well as to the base 62 of amplifier transistor 63. The emitter 64 of PNP transistor 63 connects to positive line 29, and its collector 65 to the base of output transistor stage 31. Biasing resistor 36 is proportioned to provide suitable current output by transistor 31 at normal settings, to operate the motor 17 at its present speed $N_0$ during normal conditions and environment. A sizeable condenser 66 may be connected between the base 34 transistor 31 and signal ground should it be required to suppress oscillation of the overall control loop. In the exemplary design an electrolytic condenser of ten microfarads was used.

In operation of the invention motor speed control system: the wiper 41 has been adjusted to yield a small positive voltage ($E'_{ab}$) at motor stall condition, as set forth hereinabove, and during its rotation generates the speed analog D.C. voltage $E_{ab}$ across potentiometer 38. The exemplary value of $E_{ab}$ is in the order of one to one-and-one-half volts. The wiper 37 is the speed-adjust setting and is positioned to yield the desired speed $N_0$ for the motor, as 286 r.p.m. This resulted in a nominal 400 milli-ampere series current flow through output collector 35, the brushes and armature of motor 17, and resistor 32, as well as diode 30. The normal $E_{ab}$ speed signal is thereupon impressed upon potentiometer 38 and its tapper counterpart upon base-emitter 51, 52 of control reference transistor 50. For smooth swiftly responsive speed control action, transistors 50 and 63 are in their conductive amplification mode during the said normal motor speed condition and transistor 31 operation. The signal voltage level tap-off at wiper 37 and the operating bias arrangements for the control transistors insure this mode.

The resultant current flow through resistors 60, 61 provide proper bias to base 62, sufficiently negative with respect to emitter 64 to send current through collector 65 and through resistor 36 to ground return. A rise in motor speed causes an increased control signal level at $E_{ab}$ and correspondingly across base-emitter 51, 52. An increase thereupon occurs in the collector 53 current of control transistor 50 as well as through resistors 60, 61. This produces a rise in voltage between the base and emitter 62, 64 of amplifier 63, increasing its current through collector 65 and resistor 36. The current rise through resistor 36 produces a corresponding voltage rise above ground potential and a voltage decrease between emitter 33 and base 34. The result is a reduced current through collector 35 of transistor 31 as well as through the motor 17. The motor promptly decelerates the small amount necessary to reduce the speed signal back to its preset $E_{ab}$ level for speed $N_0$.

The control system hereof operates without overshoot, detecting very small speed "errors" and corrects them smoothly in a manner not noticeable to the human ear listening to the taped music being played by the motor drive. No hunting or system oscillation occurs to deteriorate the reproduction. No wide swings are detectable under all normal operating and ambient conditions. The temperature stabilization affords wide variations in conditions of usage. The high rotational inertia of the direct drive motor, in conjunction with the electronic speed control system hereof, contributes to the inherent stability to the present speeds, as found in actual practice thereof.

When the motor speed decreases, the converse of the above stated operation occurs: The reduced voltage across base-emitter 51, 52 correspondingly reduces the current through resistors 60, 61. The voltage drop across resistor 60 thereby is decreased, reducing the voltage between base-emitter 62, 64 of amplifier stage 63. Its collector (65) current thereupon is correspondingly less, reducing the voltage drop across bias resistor 36. The voltage between base-emitter 34, 33 of output transistor 31 is thus increased, and more current flows through the transistor 31 to motor 17. The motor accelerates in response thereto until the normal speed $N_0$ provides the normal preset control signal $E_{ab}$ and its tapped-off counterpart to the reference controlled threshold voltage level transistor 30.

The invention control system is insensitive to a wide range of applied battery voltage (25), with the motor holding to the preset speed $N_0$. Thus, an increased potential at terminal 27 provides greater collector 53 current in transistor 50 as well as in collector 65 in transistor 63. Concurrently, the potential on emitter 33 is greater and would increase the current through the motor 17. However, the rise in current through amplifier 63 results in a corresponding elevated voltage across bias resistor 36, in effect cancelling the action of the battery rise on transistor 31. Similarly, upon a lowered battery voltage, the amplifiers 50 and 63 pass less current, and the potential across resistor 36 correspondingly lowers. The drop in motor current that would have occurred is thereupon avoided. For a nominal battery voltage rating of 12 volts, the system is found to directly accommodate to applied voltages from about 8 to 18 volts.

Upon start-up of the motor system hereof, the motor is at zero speed, and only a very small voltage appears at $E_{ab}$ when switch 26 is closed. This is insufficient to cause conduction of transistor 50. The potential across resistor 61 is thereupon insufficient to activate transistor 63 and the drop across bias resistor 36 is a a minimum. The result is maximum input voltage across base-emitter 34, 33 of motor transistor 31. This condition, coupled with zero back-E.M.F. by the motor 17 results in a maximum current flow through the motor. The motor immediately accelerates at a high rate, and in practice reaches its present speed $N_0$ in about 1 to 2 seconds, without overshoot. As the motor speed rises, its back-E.M.F. and signal $E_{ab}$ increases, to in turn activate the transistor control chain 50, 63, 31, reducing the motor current and rate of acceleration until it approaches and then reaches its requisite speed.

Should it for any reason become necessary to provide sufficient control effect via transistors 50 and 63 to cut-off current flow to the motor due to a condition where it would tend to overspeed, the invention circuit effects this, as follows: at high motor speed the control transistors 50 and 63 are in a higher conduction mode due to the corresponding higher level of $E_{ab}$. The increased current that thereupon flows from collector 65 through resistor 36 raises its potential above ground sufficiently to back-bias the emitter-base 33, 34 junction to cut-off the flow of current to motor 17. The voltage drop across the emitter-collector 64, 65 of amplifier 63 is sufficiently low upon its heavy conduction that base 34 is rendered more positive than emitter 33 due to the presence of diode 30. Such current cut-off to motor 17 causes it to decelerate more rapidly and reduce its speed towards normal, whereupon the control signal ($E_{ab}$) produces lowered conduction in transistors 50 and 63. The result leads towards stable current flow through transistor 31, with the motor 17 reaching its preset speed $N_0$ and normal current level in the manner set forth hereinabove. Runaway motor speed is thereby prevented by the system hereof.

The speed adjustment potentiometer (38) is in shunt across the output terminals a, b of bridge B. Its resistance magnitude is preferably at least the order of ten times that of potentiometer 40 (arms $R_3$, $R_4$). In this way it presence and adjustments have negligible effect on the bridge and the analog value of its output voltage $E_{ab}$. In the exemplary control circuit 20 the resistance of arms $R_3$ and $R_4$ together (40) is in the range of 50 to 150 ohms; with that of potentiometer 38, in the range of 1000 to 2500 ohms. The exemplary resistor 56 is 10,000 ohms. There is a relatively small current level through transistor 50 during its normal control action. Its current flows from positive terminal 27 through emitter-base 52, 53 to signal ground (28), and hence also through bridge resistor 32. The normal motor operating current, at the order of 400 milliamperes, is predominately greater than the transistor (50) current through resistor 32. In practice no detrimental action occurs therefrom, and the voltage $E_{ab}$ due to motor speed and action is found to be an excellent analog magnitude.

FIG. 4 schematically illustrates a modified speed control circuit, being a technically refined version of the basic system of FIG. 2. Similar elements and components thereof are identified with the same numerals. The motor bridge B' corresponds to bridge B, with potentiometer 40 replaced by potentiometer 70 in series with a flanking resistor 71 and a diode 72. Resistor 71 is used to simplify the adjustment of wiper 73 of balancing potentiometer 70, with better resolution in the desired speed adjust range. Diode 72 is a silicon type for improved temperature compensation. The output terminals a', b' of bridge B' provide the D.C. control signal analog of the motor speed. This control signal, tapped-off from bridge B', is impressed upon reference transistor 50 through "Sensistor" 55. The shunt capacitor 58 of FIG. 2 is superseded by electrolytic condenser 74 across resistors 60, 61. Condenser 74 at 50 microfarads provides an improved low pass filtering time constant.

An additional stage 75 of control amplification is incorporated to provide greater sensitivity and response to motor speed change, with resultant greater stability and constancy of motor speed under adverse operating and ambient conditions. Resistor 67 terminates collector 65 to ground, and generates on output signal to control the operation of transistor 75. The collector signal voltage is impressed upon the base 76 of transistor 75. The operating parameters of PNP transistor 75 are suitably established by resistor 67 for its base 76; resistor 78 for its emitter 77; and resistor 79 for its collector 80. Resistor 78 provides the operating bias for the emitter-base 33, 34 of the PNP motor transistor 31. An above-normal control signal raises the current output of control transistor 50 to correspondingly increase the voltage across the base-emitter 62, 64 of transistor 63. This raises the current through its collector 67. The resultant increased voltage across its output resistor 67 raises the voltage thereat. The input voltage in turn is reduced across the base-emitter 76, 77 of transistor 75, which correspondingly reduces the current through resistors 78 and 79.

The result is an emphasized reduction in input voltage to motor transistor 31 at its emitter-base 33, 34, with the consequent lessening of the current through its collector 35 and to motor 17. The motor 17 thereupon decelerates, in turn reducing the control back E.M.F. signal to the transistor amplifier chain 50, 63, 75, whereupon the motor speed reaches its present $N_0$ level, in stable fashion and without overshoot. Conversely, when the motor is at underspeed, the reduced control signal level to reference transistor 50 results in lowered current through resistors 60, 61 and correspondingly less voltage across the base-emitter input 62, 64 of transistor 63. The output voltage at resistor 67 is thus lowered and the input voltage across the base-emitter 76, 77 raised. The result is a higher drop at resistor 78 and increased current through transistor 31 and the motor. The motor thereup accelerates until it reaches its preset speed $N_0$ as will now be understood by those skilled in the art.

The same advantages accrue in the FIG. 4 control system as in that of FIG. 2, as rapid start-up of the motor and safety from overspeeding. The electrolytic condenser 66 of FIG. 2 is superceded by one at 81 across collector 35 of output transistor 31 and ground. Its function is also to prevent oscillation of the overall control loop and in the motor control acton. Condenser 81 is preferably at least 50 microfarads. At further safety feature is incorporated, namely a diode 82 across bridge output terminals a', b'. Its purpose is to prevent large reverse voltage from damaging control reference transistor 50 during motor start-up. Diode 82 is connected in reverse polarity configuration. It is preferably a silicon junction diode. When the motor is started-up from zero speed there is no back-E.M.F. generated. However there is the danger of reversed voltage being applied to the transistor 50 due to inductive spikes caused by small irregularities in brush-commutator contacting. When the signal at terminal b' is positive with respect to terminal a', the diode 82 will conduct, reducing the voltage thereat. The transistor 50 is thus protected.

As mentioned hereinabove, it is important to make the brush arrangement of the motor 17 so that its effect is minimal on the resultant analog control signal ($E_{ab}$), in fact and in operation. A brush-commutator assembly 85 is illustrated in FIG. 5, in end view, for the purpose of describing the principles and factors involved therein. Other arrangements thereof, of equivalent purpose and result, are of course feasible. The four brushes 86, 86 are symmetrically mounted about the commutator 87 in a manner: to provide firm brush seating and contact pressure; to avoid bounce, vibration and brush migration; to prevent turning or rotation of the brushes. These mechanical aspects of the brush system are to prevent or minimize variations in voltage drop at the brushes 86, 86 during motor operation and control, particularly during adverse conditions. In this manner false signal changes are avoided in the control voltage $E_{ab}$.

The illustrative brush assembly 85 contains individual brush holders 88, 88 extending from pivot posts 89, 89 on the motor 90. The holders 88, 88 are metallic strips at the far ends of which are firmly secured the brushes 86, 86 with good electrical contact. The connection leads 91, 91 are soldered or crimped to brush holders 88, 88. Each pivoted holder 88 is held spring biased against the periphery of commutator 87 with its brush 86 tangent thereto through a coiled spring 92. Springs 92, 92 are fastened at one end in pins 93, 93 on motor 90, and at the other tied or riveted to an intermediate portion of the holder 88, 88. Such elaborate brush apparatus 85 may be simplified in practice, retaining the desired advantageous features of substantial circuital constancy referred to. A brush spring tension of 10 to 12 pounds per square inch has been found useful for noise-free and stable motor operation. Such pressure is somewhat greater than for standard motors, but has been found to yield reasonably long brush life.

Ideally, the motor control system would have zero brush voltage drop. This would present the true back-E.M.F for the whole control action, and would not be subject to the extraneous variations that though very small in magnitude would introduce deleterious control effects. The next best course is to make the total brush drop at a minimum consistant with the motor structure and reasonable brush life and wear. Such brushes are vary low-resistance composite metal-graphite such as copper-graphite or silver-graphite. A satisfactory brush is made of 75% silver and 25% graphite material, with a Scleroscope hardness at 20. Such 75/25 silver-graphite brushes are made by the Speer Carbon Company, their type B-1260. The actual ratio of silver to graphite is not critical. The brushes should seat smoothly on the commutator without unreasonable wear, and generate a minimum of electrical "noise."

Optimum brush material and mounting arrangement are important where precise stable motor speed control is desired for quality acoustic and stereo reproduction. The invention control system using brushes at 86, 86 having the aforesaid characteristics afford such practical results. Excellent results have been found with brushes of 93% silver and 7% graphite. Their contact resistance variations are of the order of .001 ohm, while those of comparable all graphite yield the order of .010 ohms and more. The use of practical brushes with low contact resistance material is desirable. Brushes of 93/7 silver/graphite made by the Speer Carbon Company, type B-7052, with relatively low hardness meet such requirement and performance. Such low contact resistance variation, in operation, is a small percentage of the overall resistance of the motor as presented to the bridge (B), and thus exert only a second order effect in the speed control hereof. Further, long term brush wear, though changing its resistance in time does not affect constancy of motor speed during any particular play period. When brush wear has produced a noticeable drift versus the present speed $N_0$, one may reset the speed adjust tap (38) or replace the brushes, as indicated. The brushes 86, 86 may be in the form of small buttons, each secured to the tip of an individual spring arm that suitably presses them against the commutator. The brushes are securely anchored as by welding or soldering. The spring arms may be of Phosphor bronze 0.010″ thick.

Although the invention has been set forth and described in specific embodiment and application, it is to be understood that variations and modifications thereof may be made within the broader spirit and scope of the invention, as set forth in the following claims.

What is claimed is:

1. A motor speed control system comprising a direct current motor; a control bridge having one resistance arm in series circuit with the armature of said motor and with output connections that present a unidirectional control signal substantially directly proportional to the speed of said motor over a relatively wide range of speed; circuit means including a control transistor responsive to said unidirectional control signal, and a power transistor in circuit with the motor armature, said power transistor being in operative connection with said control transistor for supplying operating current to said motor in accordance with the magnitude of the signal; and voltage reference means arranged with said control transistor for determining the control action of said signal to maintain said motor at a preset speed.

2. A motor speed control system as claimed in claim 1, further including a diode in reverse bias connection shunted across said control bridge output connections to protect said control transistor from overloading.

3. A motor speed control system as claimed in claim 1, in which the output of said power transistor is in series connection between the motor armature and a source of system potential, means for biasing the input of said power transistor to effect normal output current therefrom to the motor armature at a control signal level for nomal motor speed, and amplifying means for applying sufficient reverse biasing input to said power transistor to substantially cut-off its output current flow to the motor armature upon substantial motor overspeed condition and thereby cause the motor to decelerate rapidly.

4. A motor speed control system as claimed in claim 3, further including a diode in series between the output of said power transistor and said source of potential.

5. A motor speed control system as claimed in claim 3, in which said voltage reference means includes a temperature sensitive resistor connected to the input of said control transistor for maintaining said reference substantially constant over a wide temperature range.

6. A motor speed control system as claim in claim 5, in which said resistor has a positive temperature coefficient, and further including a second resistor coupled between said temperature sensitive resistor and said control transistor.

7. A motor speed control system as claimed in claim 1, in which the commutator-brush resistance of the motor armature is significantly low in magnitude to maintain the proportionality of control signal magnitude to motor speed.

8. A motor speed control system as claimed in claim 3, in which the commutator-brush resistance of the motor armature is significantly low in magnitude to maintain the proportionality of control signal magnitude to motor speed.

References Cited

UNITED STATES PATENTS

| | | | |
|---|---|---|---|
| 656,652 | 8/1900 | Markey | 310—251 |
| 3,214,666 | 10/1965 | Clerc | 318—331 X |
| 3,241,024 | 3/1966 | Schade et al. | 318—331 |
| 3,268,790 | 8/1966 | Novak | 318—331 |
| 3,324,372 | 6/1967 | Myers | 318—227 |

ORIS L. RADER, *Primary Examiner.*

J. J. BAKER, *Assistant Examiner.*